US012482940B2

(12) United States Patent
Blauert

(10) Patent No.: US 12,482,940 B2
(45) Date of Patent: Nov. 25, 2025

(54) AZIMUTHAL STEERING ANTENNA FOR SIDE RADAR

(71) Applicant: Aptiv Technologies AG, Schaffhausen (CH)

(72) Inventor: John Karl Blauert, Westfield, IN (US)

(73) Assignee: Aptiv Technologies AG, Schaffhausen (CH)

( * ) Notice: Subject to any disclaimer, the term of this patent is extended or adjusted under 35 U.S.C. 154(b) by 15 days.

(21) Appl. No.: 18/538,848

(22) Filed: Dec. 13, 2023

(65) Prior Publication Data

US 2025/0202117 A1 Jun. 19, 2025

(51) Int. Cl.
*H01Q 5/55* (2015.01)
*H01Q 1/32* (2006.01)

(52) U.S. Cl.
CPC ................. *H01Q 5/55* (2015.01); *H01Q 1/32* (2013.01)

(58) Field of Classification Search
None
See application file for complete search history.

(56) References Cited

U.S. PATENT DOCUMENTS 5,568,160 A * 10/1996 Collins .................. H01Q 21/24 343/778
5,926,147 A * 7/1999 Sehm ................... H01Q 21/061 343/777
11,533,815 B2 * 12/2022 Kim ....................... H05K 1/141
2015/0349415 A1 * 12/2015 Iwanaka .............. H01Q 21/064 343/786
2016/0056537 A1 2/2016 Guler et al.
2020/0112077 A1 * 4/2020 Kamo ..................... G01S 7/032

FOREIGN PATENT DOCUMENTS

KR 102464791 B1 11/2022
KR 20230118592 A 8/2023
KR 20230118592 A1 * 8/2023

OTHER PUBLICATIONS

Extended European Search Report regarding European Patent Application No. 24168587.4, dated Oct. 9, 2024.

* cited by examiner

*Primary Examiner* — Dameon E Levi
*Assistant Examiner* — Anh N Ho
(74) *Attorney, Agent, or Firm* — Harness, Dickey & Pierce, P.L.C.

(57) ABSTRACT

An antenna assembly configured to steer a radio frequency (RF) signal to a focus area offset from an azimuth center. The antenna assembly includes a feed horn defined by a conductive top plate between an inner surface and an outer surface of the plate. The feed horn is aligned with a waveguide. A step is defined by the conductive top plate extending from a surface of the feed horn towards the focus area. The step is configured to steer the RF signal to emanate from the outer surface of the conductive top plate towards the focus area.

16 Claims, 5 Drawing Sheets

AZIMUTHAL STEERING ANTENNA FOR SIDE RADAR

FIELD

The present disclosure relates to an azimuthal steering antenna for a side radar.

BACKGROUND

This section provides background information related to the present disclosure, which is not necessarily prior art.

Radar uses electromagnetic signals to detect and track objects. The electromagnetic signals are transmitted and received using one or more antennas. An antenna may be characterized in terms of gain and beam width, or more specifically pattern, which is a measure of the gain as a function of direction. By modifying the radiation pattern, the antenna may be customized for a specific application. For example, the radiation pattern may be offset from center for a side radar application.

SUMMARY

This section provides a general summary of the disclosure, and is not a comprehensive disclosure of its full scope or all of its features.

The present disclosure includes, in various features, an antenna assembly configured to steer a radio frequency (RF) signal to a focus area offset from an azimuth center. The antenna assembly includes: a circuit board including an integrated circuit configured to process the RF signal, and a conductive trace extending from the integrated circuit; a waveguide plate over the circuit board, the waveguide plate including a waveguide configured to guide the RF signal at least one of to and from the conductive trace; and a conductive top plate over the waveguide plate. The conductive top plate includes: an outer surface and an inner surface facing the waveguide plate, the outer surface is opposite to the inner surface; a feed horn defined by the conductive top plate between the inner surface and the outer surface, the feed horn is aligned with the waveguide; a first surface and a second surface of the feed horn that is opposite to the first surface, the first surface is angled towards the focus area; and a step defined by the conductive top plate extending from the first surface to the outer surface towards the focus area, the step configured to steer the RF signal to emanate from the outer surface of the conductive top plate towards the focus area.

In further features, the feed horn is normal to the outer surface of the conductive top plate.

In further features, the second surface of the feed horn is angled away from the first surface.

In further features, the focus area is 60° offset from the azimuth center.

In further features, the antenna assembly is configured as a side antenna for a vehicle.

In further features, the step includes a tread surface extending parallel to the outer surface of the conductive top plate.

In further features, the step includes a riser surface extending away from a tread surface towards the outer surface of the conductive top plate.

In further features, the step includes: a tread surface extending parallel to the outer surface of the conductive top plate; a riser surface extending away from the tread surface towards the outer surface of the conductive top plate; a first curved surface extending from the first surface of the feed horn to the tread surface; a second curved surface between the tread surface and the riser surface; and a third curved surface between the riser surface and the outer surface.

In further features, a fourth curved surface is between the second surface of the feed horn and the outer surface.

In further features, the step includes a tread surface and a riser surface, the tread surface has a depth that is greater than a height of the riser surface.

In further features, the step includes a tread surface and a riser surface; the tread surface has a depth of between 0.25 and 0.5 of a wavelength of the RF signal; and the riser surface has a height of 0.25 of the wavelength of the RF signal.

In further features, the tread surface has a depth of 1.42 mm; and the riser surface has a height of 1.0 mm.

In further features, the feed horn has a maximum width between the first surface and the second surface of 0.25 of a wavelength of the RF signal.

The present disclosure further includes, in various features, an antenna assembly configured to steer a radio frequency (RF) signal to a focus area offset from an azimuth center. The antenna assembly includes: a circuit board including an integrated circuit configured to process the RF signal, and a conductive trace extending from the integrated circuit; a waveguide plate over the circuit board, the waveguide plate including a waveguide configured to guide the RF signal at least one of to and from the conductive trace; and a conductive top plate over the waveguide plate. The conductive top plate includes: an outer surface and an inner surface facing the waveguide plate, the outer surface is opposite to the inner surface; a feed horn defined by the conductive top plate; and a step defined by the conductive top plate adjacent to the feed horn, the step including a tread surface and a riser surface extending from the tread surface towards the outer surface of the conductive top plate.

In further features, the tread surface extends parallel to the outer surface.

In further features, the focus area is at least 60° offset from the azimuth center.

In further features, the tread surface has a depth that is greater than a height of the riser surface.

In further features, the tread surface has a depth of between 0.25 and 0.5 of a wavelength of the RF signal; and the riser surface has a height of 0.25 of the wavelength of the RF signal.

In further features, the tread surface has a depth of 1.42 mm; and the riser surface has a height of 1.0 mm.

The present disclosure also includes, in various features, an antenna assembly configured to steer a radio frequency (RF) signal to a focus area offset from an azimuth center. The antenna assembly includes: a circuit board including an integrated circuit configured to process the RF signal, and a conductive trace extending from the integrated circuit; a waveguide plate over the circuit board, the waveguide plate including a waveguide configured to guide the RF signal at least one of to and from the conductive trace; and a conductive top plate over the waveguide plate. The conductive top plate includes: an outer surface and an inner surface facing the waveguide plate, the outer surface is opposite to the inner surface; a feed horn defined by the conductive top plate between the inner surface and the outer surface, the feed horn is aligned with the waveguide; a first surface and a second surface of the feed horn, the first surface is opposite to the second surface and is angled towards the focus area away from the second surface; and a step defined by the conductive top plate extending towards the focus area from the first surface to the outer surface, the step including a tread surface and a riser surface configured to steer the RF signal to emanate from the outer surface of the conductive top plate towards the focus area. The tread surface has a depth of between 0.25 and 0.5 of a wavelength of the RF signal; and the riser surface has a height of 0.25 of the wavelength of the RF signal.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

Figure 3:
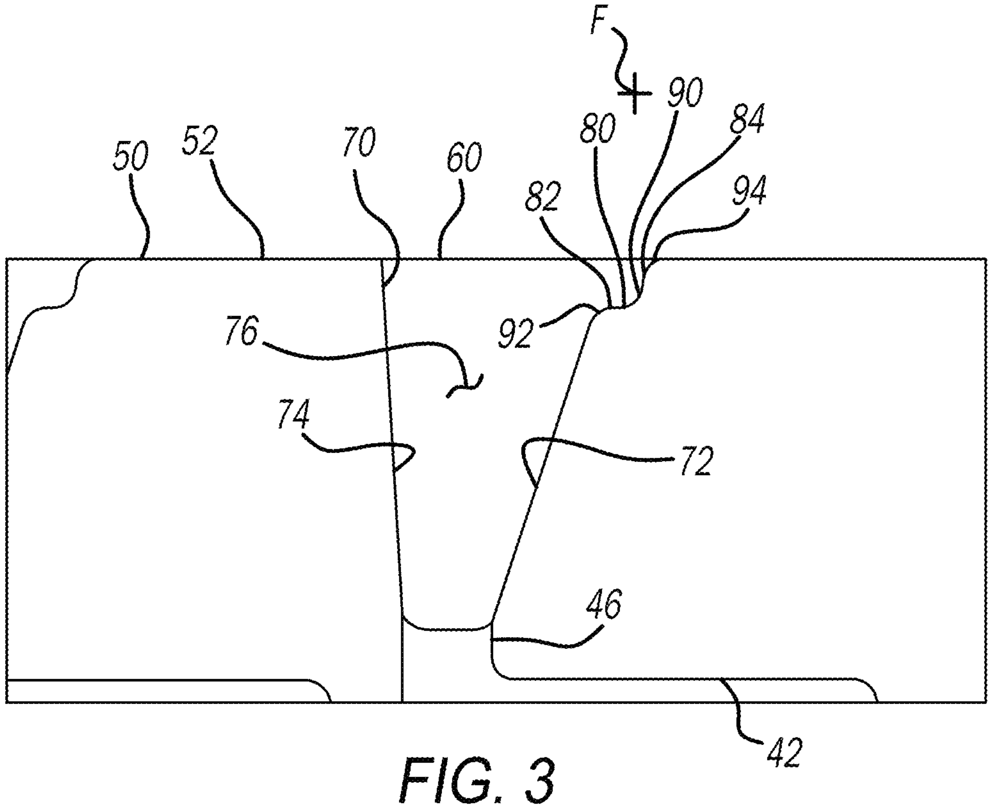
Figure 2:
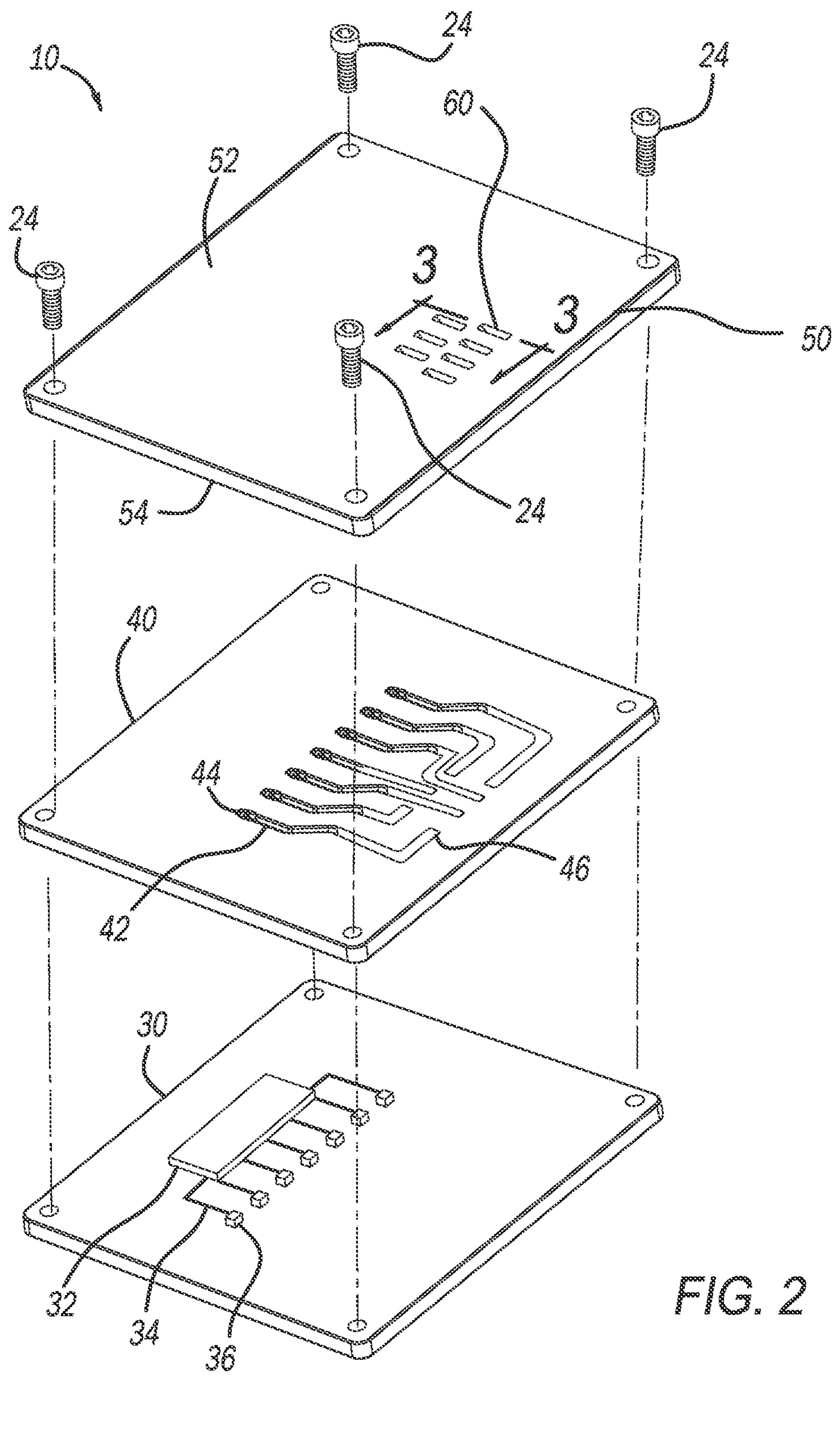
FIG. 2 is an exploded view of the antenna assembly of FIG. 1.
Figure 4:
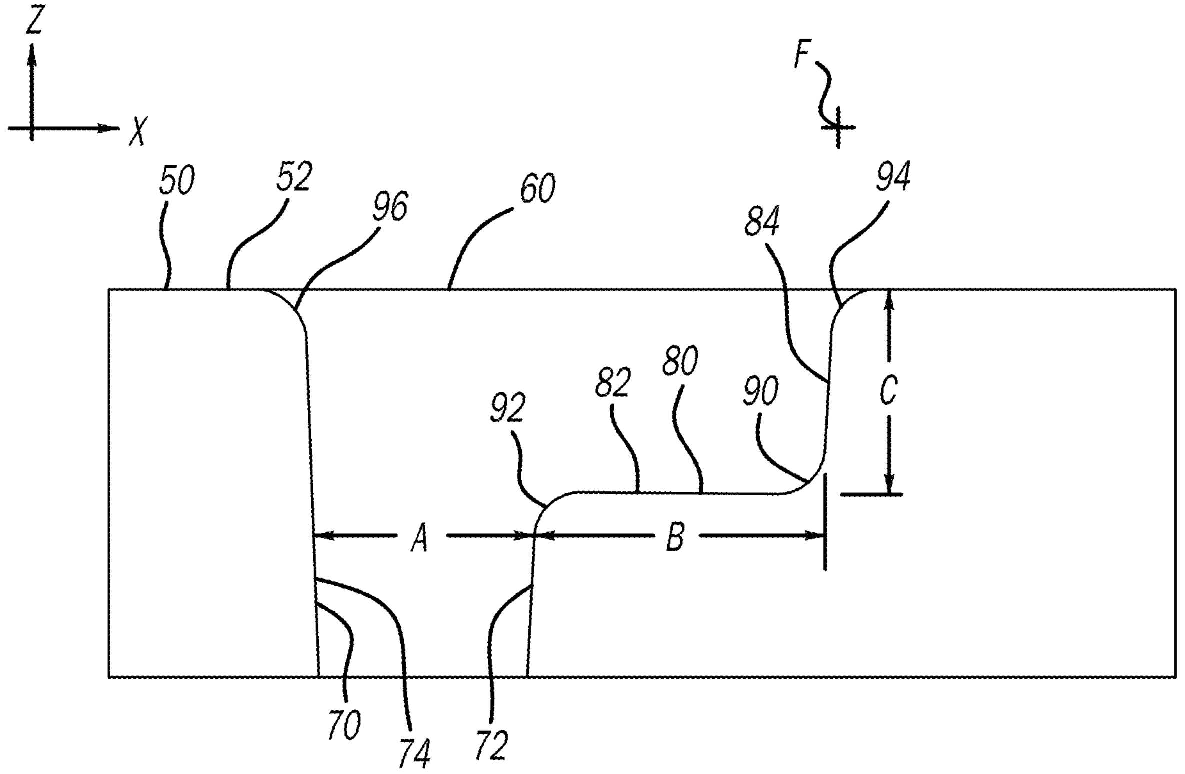
Figure 5:
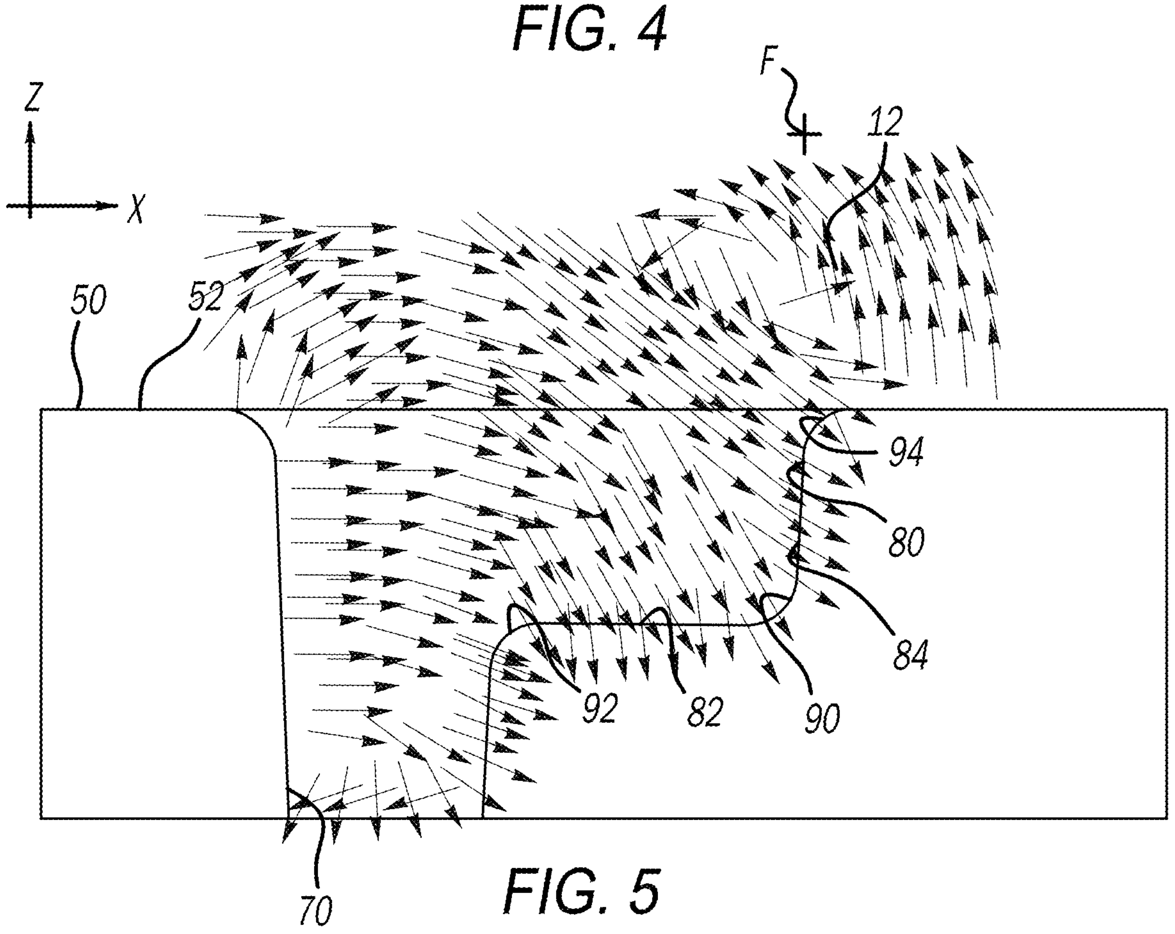
Figure 6:
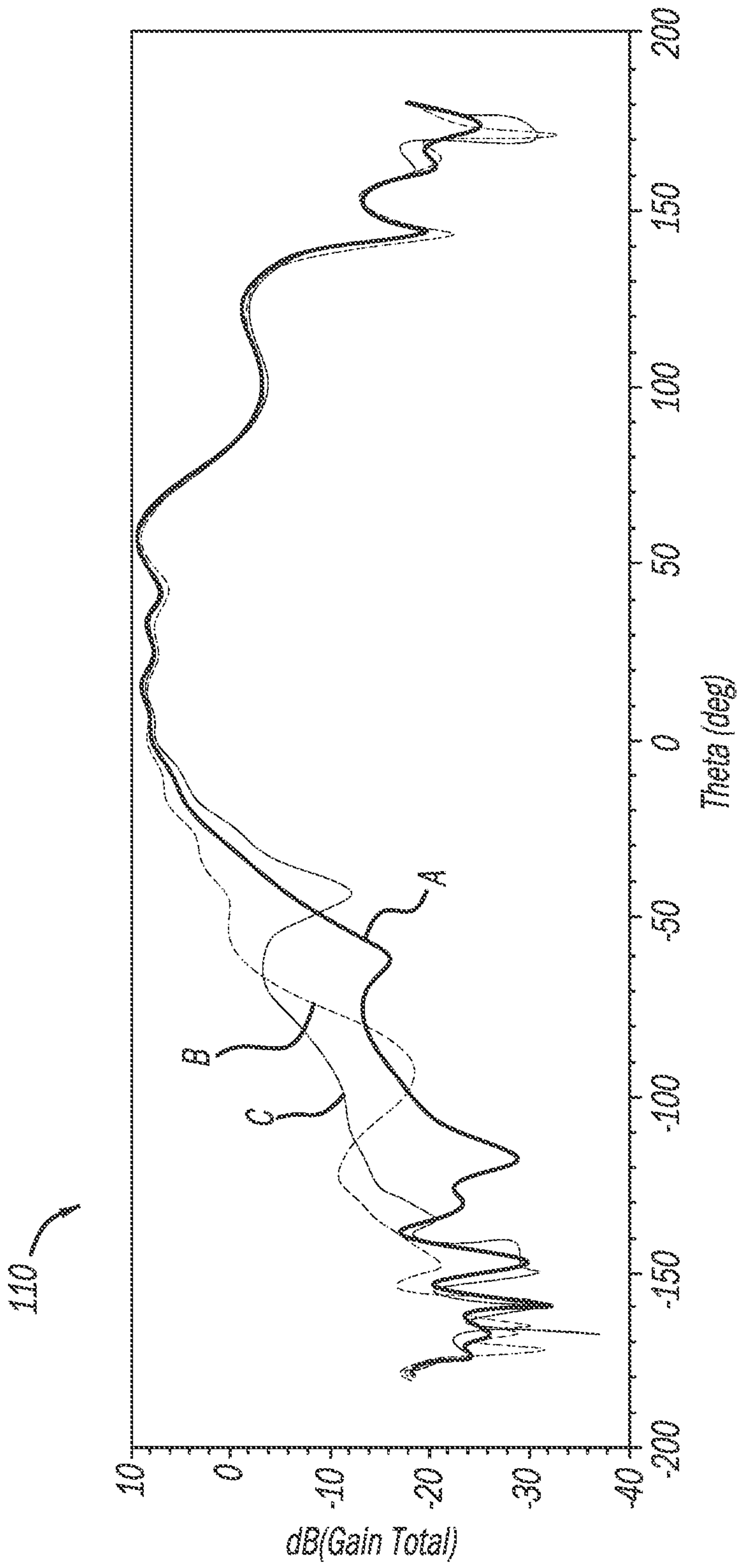
Figure 7:
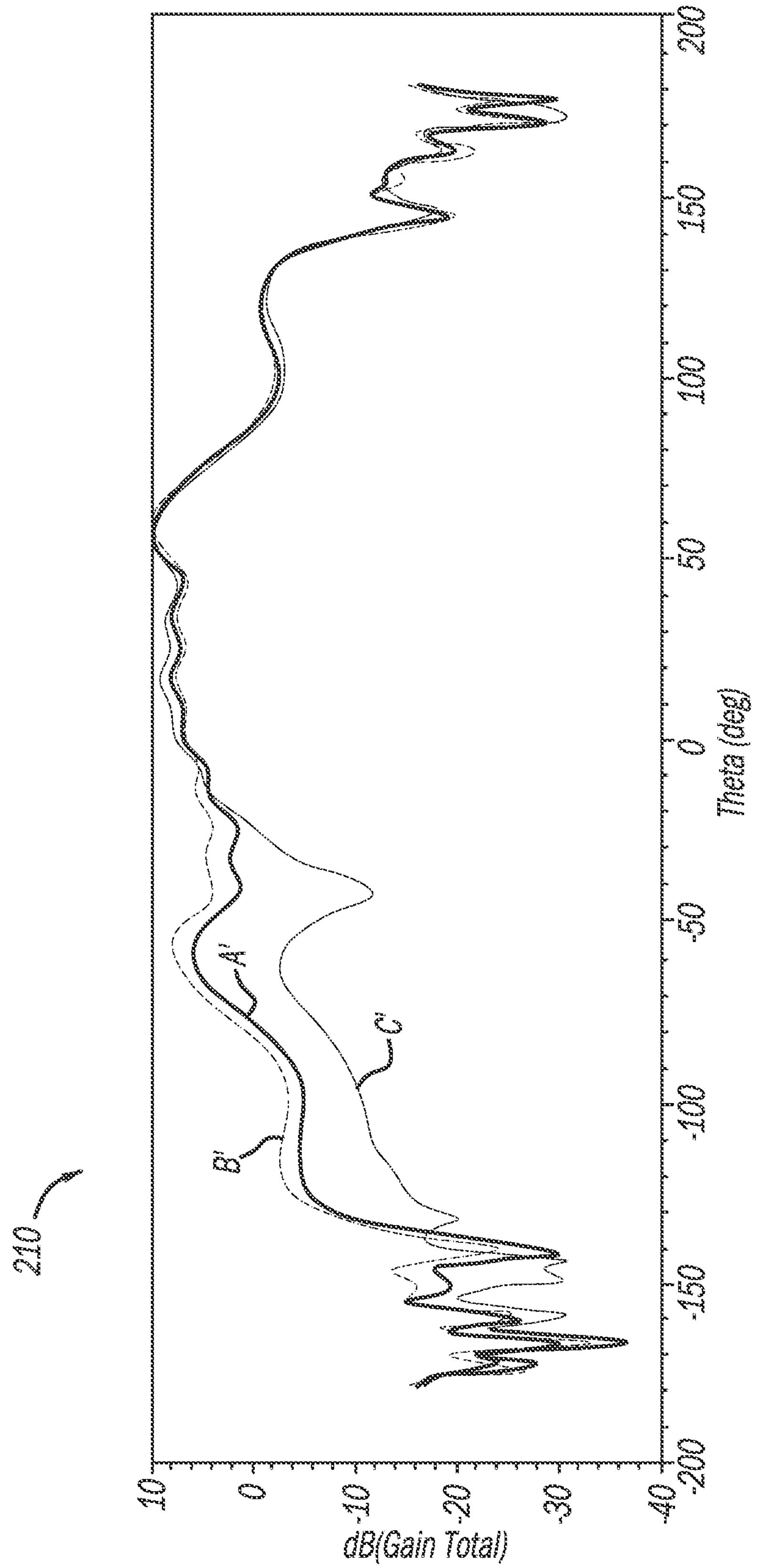

FIG. 3 a cross-sectional view of a conductive top plate of the radar assembly taken along line 3-3 of FIG. 2;

FIG. 4 is another cross-sectional view of a conductive top plate in accordance with the present disclosure;

FIG. 5 illustrates exemplary radio frequency signals emanating from the conductive top plate of FIG. 4;

FIG. 6 is a graph illustrating an exemplary radiation pattern of an antenna assembly in accordance with the present disclosure; and FIG. 7 is a graph illustrating another exemplary radiation pattern of an antenna assembly in accordance with the present disclosure.

Corresponding reference numerals indicate corresponding parts throughout the several views of the drawings.

DETAILED DESCRIPTION

Example embodiments will now be described more fully with reference to the accompanying drawings.

Side radars may be configured to steer radio frequency (RF) signals towards a particular area to optimize performance. The present disclosure provides for an antenna assembly configured to steer the RF signals to a focus area offset from an azimuth center of the antenna assembly. A conductive top plate of the antenna assembly defines a feed horn, and a step extending from the feed horn to an outer surface of the top plate. The step is configured to steer the RF signals to emanate from the outer surface towards the focus area. The step includes a tread surface and a riser surface. The step may be formed with a tread surface and a riser surface of any suitable dimensions to generate a customized radiation pattern suitable for a particular application. For example, the depth of the tread surface and height of the riser surface may be varied to customize the radiation pattern, as explained herein.

Figure 1:
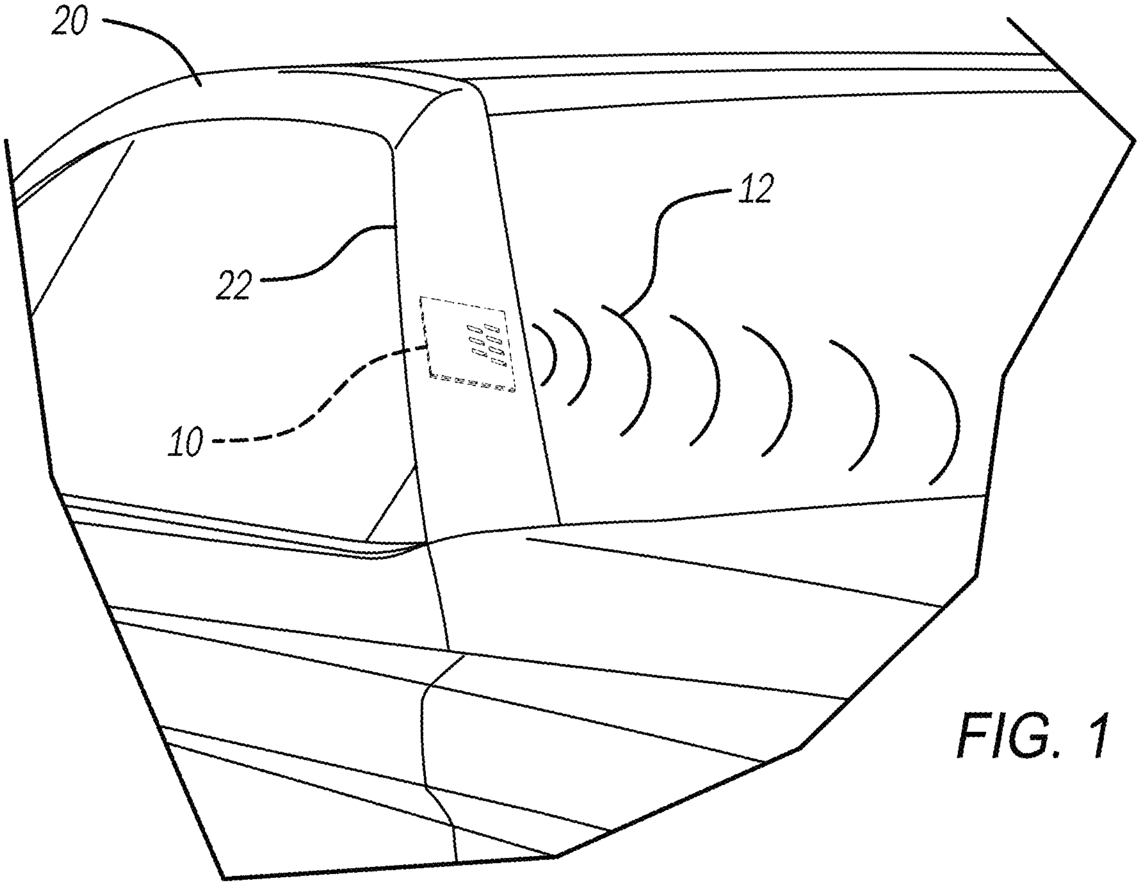
FIG. 1 illustrates a radar assembly in accordance with the present disclosure configured as a side radar mounted at an exemplary installation site on a vehicle.

FIGS. 1 and 2 illustrate an exemplary antenna assembly 10 in accordance with the present disclosure. The antenna assembly 10 is configured for use in any suitable application, such as an automotive application. In the example of FIG. 1, the antenna assembly 10 is mounted to a vehicle 20. The antenna assembly 10 may be mounted to any suitable location of the vehicle 20, such as on an A-pillar 22 of the vehicle 20. The antenna assembly 10 is configured to transmit and/or receive radio frequency (RF) signals 12 to a focus area offset from an azimuth center of the antenna assembly. The antenna assembly 10 is thus particularly suited for being mounted as a side radar. In the example of FIG. 1, the RF signals 12 are directed towards a focus area at a front of the vehicle 20, even though a conductive top plate of the antenna assembly 10 faces towards a side of the vehicle 20, or towards a front corner of the vehicle 20. The antenna assembly 10 may be configured for any other suitable automotive or non-automotive use as well.

With particular reference to FIG. 2, the antenna assembly 10 generally includes a circuit board 30, a waveguide plate 40, and a conductive top plate 50. The circuit board 30, the waveguide plate 40, and the conductive top plate 50 are secured together in any suitable manner, such as with any suitable fasteners 24. The waveguide plate 40 is secured between the circuit board 30 and the conductive top plate 50.

The circuit board 30 includes an integrated circuit (IC) 32 configured to process radio frequency (RF) signals. Extending from the IC 32 are conductive traces 34, which are electrically connected to the IC 32. Conductive pads 36 are at distal ends of the traces 34. The pads 36 and the traces 34 are configured to electrically conduct RF signals to and from the IC 32.

Mounted over the circuit board 30 is the waveguide plate 40. The waveguide plate 40 defines a plurality of waveguides 42. The waveguides 42 extend from feeding holes 44. The feeding holes 44 are aligned with the pads 36 of the circuit board 30. RF signals transmitted from the IC 32 are conducted along the traces 34 to the pads 36, and through the feeding holes 44 of the waveguide plate 40 to the waveguides 42. Conversely, received RF signals are directed by the waveguides 42 to the feeding holes 44 and to the IC 32 by way of the pads 36 and the traces 34. Distal ends 46 of the waveguides 42 opposite to the feeding holes 44 are positioned and shaped to align with feed horns 70 of the conductive top plate 50. Each one of the distal ends 46 may include multiple branch ends. Each branch end may be aligned with a different feed horn 70. In some applications, more than one branch end of the multiple branches may be aligned with the same feed horn 70.

The conductive top plate 50 has an outer surface 52 and an inner surface 54. The outer surface 52 is opposite to the inner surface 54. The inner surface 54 faces the waveguide plate 40. The outer surface 52 is an outer surface of the antenna assembly 10. The conductive top plate 50 is made of any suitable conductive material, such as any suitable metallic material.

With continued reference to FIGS. 1 and 2, and additional reference to FIG. 3, the conductive top plate 50 defines a plurality of slots 60, each of which are openings of a different feed horn 70. FIG. 3 is a cross-sectional view of one of the feed horns 70. The feed horns 70 are normal to the outer surface 52 and configured to direct transmitted RF signals to the focus area E offset from the azimuth center of the antenna assembly 10, as explained herein. The feed horns 70 are also configured to direct received RF signals to the distal ends 46 of the waveguides 42. The feed horns 70 may be symmetric or asymmetric.

Each feed horn 70 includes a first surface 72 and a second surface 74. The first and the second surfaces 72 and 74 extend away from the distal end 46 of the waveguide 42 towards the outer surface 52 of the conductive top plate 50. The first surface 72 is opposite to the second surface 74. The first and the second surfaces 72, 74 are connected by side surfaces 76. The first and the second surfaces 72, 74 may be generally symmetrical whereby the first and the second surfaces 72, 74 extend generally parallel to each other. In other applications, the first and the second surfaces 72, 74 may be asymmetrical. In the example of FIG. 3, the first surface 72 is angled away from the second surface 74 towards the focus area F. Thus, the first surface 72 is angled in a direction in which the RF signals 12 are to be steered. The first surface 72 terminates prior to reaching the outer surface 52.

The conductive top plate 50 also defines a step 80, which extends from the first surface 72 to the outer surface 52. The step 80 also extends towards the focus area F. The step 80 is configured to steer the RF signal 12 to emanate from the outer surface 52 of the conductive top plate 50 towards the focus area E, as explained further herein and generally illustrated in FIG. 5.

The step 80 includes a tread surface 82 and a riser surface 84. The tread surface 82 extends parallel to, or generally parallel to, the outer surface 52. The riser surface 84 extends away from the tread surface 82 towards the outer surface 52 of the conductive top plate 50. The riser surface 84 may be at a right angle to the tread surface 82, or angled away from the tread surface 82. For example, the riser surface 84 may be angled to extend along a line that is parallel to, or generally parallel to, the first surface 72.

Between the tread surface 82 and the riser surface 84 is a first curved surface 90. Between the first surface 72 and the tread surface 82 is a second curved surface 92. The step 80 may further include a third curved 94 surface extending from the riser surface 84 to the outer surface 52. As shown in the example of FIG. 4, a fourth curved surface 96 may extend from the second surface 74 to the outer surface 52.

The feed horns 70 may be formed with any customized dimensions suitable to steer the RF signals 12 towards the focus area offset from the azimuth center of the antenna assembly 10. For example and with reference to the exemplary configuration of FIG. 4, the feed horn 70 may be formed with any suitable maximum distance A between the first surface 72 and the second surface 74. The tread surface 82 may be formed with any suitable depth B from the first surface 72 to the riser surface 84. And the riser surface 84 may be formed with any suitable height C from the tread surface 82 to the outer surface 52.

In one exemplary configuration, the maximum distance A of the feed horn 70 between the first surface 72 and the second surface 74 may be one-quarter of the wavelength of the RF signal 12, which may be 1.0 mm, for example. The tread surface 82 may be formed with depth B of between one-quarter and one-half of a wavelength of the RF signal 12. For example, the tread surface 82 may have a depth B of 1.42 mm. The riser surface 84 may have a height C that is one-quarter of the wavelength of the RF signal 12. For example, the riser surface 84 may have a height C of 1.0 mm. These dimensions of the feed horn 70 and the step 80 are suitable, in some applications, to focus the RF signal 12 to be offset from the azimuth center by 60°, or about 60°, for example. The feed horn 70 and the step 80 may be formed with any other suitable dimensions to focus the RF signal 12 to an area offset from the azimuth center at any other suitable angle as well.

FIG. 5 illustrates an exemplary RF signal 12 emanating from the feed horn 70 along the step 80 to the focus area offset from the azimuth center of the antenna assembly 10. The feed horn 70 and the step 80 cause the RF signal 12 to be delayed in the positive X-direction identified in FIG. 5. This delay in field propagation effectively steers the RF signal 12 to the focus area offset from the azimuth center.

Generally, the greater the depth B of the tread surface 82, the greater the delay of the RF signal 12, which allows for higher gain towards the edge of the field of view along the azimuth. The shorter the depth B of the tread surface 82, the less beam steering that will occur. If the depth becomes too great, grating lobes may occur.

With respect to the height C of the riser surface 84, it may also be customized to vary the radiation pattern of the RF signal 12. Generally, the greater the height C, and thus the higher the riser surface 84 extends in the Z direction, the more space there is for the RF signal 12 propagation to become even by the final aperture at the slot 60, which thereby reduces the beam steering. Conversely, if the riser surface 84 is too tall along line C, there may not be enough of a potential for the RF signal 12 to couple through the step 80. Providing the riser surface 84 with a height C that is one-quarter of a wavelength of the RF signal 12, such as 1 mm, may be suitable for a range of side radar applications.

FIG. 6 illustrates exemplary radiation patterns 110 of the antenna assembly 10. Radiation pattern A is generated by the antenna assembly 10 when the tread surface 82 is provided with a depth B that is just under half a wavelength of the RF signal 12, which may be 1.42 mm, or about 1.42 mm, for example. And radiation pattern A is generated when the riser surface 84 is provided with a height C that is 1 mm. Radiation pattern B results when the tread surface 82 is formed with a relatively shorter depth B. Radiation pattern C results when the tread surface 82 is formed with a relatively longer depth B. The radiation patterns represent the tuneability of the antenna assembly 10.

FIG. 7 illustrates additional exemplary radiation patterns 210 of the antenna assembly 10. Radiation pattern A' is generated by the antenna assembly 10 when the riser surface 84 has a height C of one-quarter of a wavelength of the RF signal 12, which may be 1.0 mm, or about 1.0 mm, for example. And radiation pattern A' is generated when the tread surface 82 is provided with a depth B that is 2 mm. Radiation pattern B' results when the riser surface 84 is formed with a relatively shorter height C. Radiation pattern C' results when the riser surface 84 is formed with a relatively taller height C. The radiation patterns represent the tuneability of the antenna assembly 10.

The antenna assembly 10 may thus be configured to steer the RF signal 12 to a focus area offset from the azimuth center of the antenna assembly 10. In particular, the feed horn 70 and the step 80 may be formed with any suitable dimensions to customize the radiation pattern to be offset any suitable distance from the azimuth center.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. An antenna assembly configured to steer a radio frequency (RF) signal to a focus area offset from an azimuth center, the antenna assembly comprising:

a circuit board including an integrated circuit configured to process the RF signal, and a conductive trace extending from the integrated circuit;

a waveguide plate over the circuit board, the waveguide plate including a waveguide configured to guide the RF signal at least one of to and from the conductive trace; and a conductive top plate over the waveguide plate, the conductive top plate including, an outer surface and an inner surface facing the waveguide plate, the outer surface is opposite to the inner surface, a feed horn defined by the conductive top plate between the inner surface and the outer surface, the feed horn is aligned with the waveguide, a first surface and a second surface of the feed horn that is opposite to the first surface, the first surface is angled towards the focus area, and a step defined by the conductive top plate extending from the first surface to the outer surface towards the focus area, the step configured to steer the RF signal to emanate from the outer surface of the conductive top plate towards the focus area, wherein the step includes:

a tread surface extending parallel to the outer surface of the conductive top plate;

a riser surface extending away from the tread surface towards the outer surface of the conductive top plate;

a first curved surface extending from the first surface of the feed horn to the tread surface;

a second curved surface between the tread surface and the riser surface; and a third curved surface between the riser surface and the outer surface.

2. The antenna assembly of claim 1, wherein the feed horn is normal to the outer surface of the conductive top plate.

3. The antenna assembly of claim 1, wherein the second surface of the feed horn is angled away from the first surface.

4. The antenna assembly of claim 1, wherein the focus area is 60° offset from the azimuth center.

5. The antenna assembly of claim 1, wherein the antenna assembly is configured as a side antenna for a vehicle.

6. The antenna assembly of claim 1, further comprising a fourth curved surface between the second surface of the feed horn and the outer surface.

7. The antenna assembly of claim 1, wherein the tread surface has a depth that is greater than a height of the riser surface.

8. The antenna assembly of claim 1, wherein:

the tread surface has a depth of between 0.25 and 0.5 of a wavelength of the RF signal; and the riser surface has a height of 0.25 of the wavelength of the RF signal.

9. The antenna assembly of claim 8, wherein:

the tread surface has a depth of 1.42 mm; and the riser surface has a height of 1.0 mm.

10. The antenna assembly of claim 8, wherein the feed horn has a maximum width between the first surface and the second surface of 0.25 of a wavelength of the RF signal.

11. An antenna assembly configured to steer a radio frequency (RF) signal to a focus area offset from an azimuth center, the antenna assembly comprising:

a circuit board including an integrated circuit configured to process the RF signal, and a conductive trace extending from the integrated circuit;

a waveguide plate over the circuit board, the waveguide plate including a waveguide configured to guide the RF signal at least one of to and from the conductive trace; and a conductive top plate over the waveguide plate, the conductive top plate including, an outer surface and an inner surface facing the waveguide plate, the outer surface is opposite to the inner surface, a feed horn defined by the conductive top plate, and a step defined by the conductive top plate adjacent to the feed horn, the step including a tread surface extending parallel to the outer surface of the conductive top plate, a riser surface extending away from the tread surface towards the outer surface of the conductive top plate, a first curved surface extending from the feed horn to the tread surface, a second curved surface between the tread surface and the riser surface, and a third curved surface between the riser surface and the outer surface.

12. The antenna assembly of claim 11, wherein the focus area is at least 60° offset from the azimuth center.

13. The antenna assembly of claim 11, wherein the tread surface has a depth that is greater than a height of the riser surface.

14. The antenna assembly of claim 11, wherein:

the tread surface has a depth of between 0.25 and 0.5 of a wavelength of the RF signal; and the riser surface has a height of 0.25 of the wavelength of the RF signal.

15. The antenna assembly of claim 11, wherein:

the tread surface has a depth of 1.42 mm; and the riser surface has a height of 1.0 mm.

16. An antenna assembly configured to steer a radio frequency (RF) signal to a focus area offset from an azimuth center, the antenna assembly comprising:

a circuit board including an integrated circuit configured to process the RF signal, and a conductive trace extending from the integrated circuit;

a waveguide plate over the circuit board, the waveguide plate including a waveguide configured to guide the RF signal at least one of to and from the conductive trace; and a conductive top plate over the waveguide plate, the conductive top plate including, an outer surface and an inner surface facing the waveguide plate, the outer surface is opposite to the inner surface, a feed horn defined by the conductive top plate between the inner surface and the outer surface, the feed horn is aligned with the waveguide, a first surface and a second surface of the feed horn, the first surface is opposite to the second surface and is angled towards the focus area away from the second surface, and a step defined by the conductive top plate extending towards the focus area from the first surface to the outer surface, the step including a tread surface extending parallel to the outer surface of the conductive top plate, a riser surface extending away from the tread surface towards the outer surface of the conductive top plate and configured to steer the RF signal to emanate from the outer surface of the conductive top plate towards the focus area, a first curved surface extending from the first surface of the feed horn to the tread surface, a second curved surface between the tread surface and the riser surface, and a third curved surface between the riser surface and the outer surface;

wherein:

the tread surface has a depth of between 0.25 and 0.5 of a wavelength of the RF signal; and the riser surface has a height of 0.25 of the wavelength of the RF signal.

* * * * *